June 29, 1948.                    J. C. ARNOLD                    2,444,394
METHOD OF MOLDING DIAPHRAGMS
Filed March 11, 1943
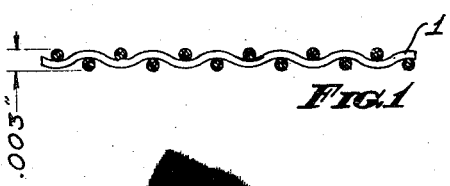
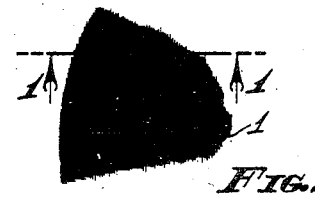
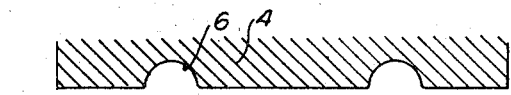
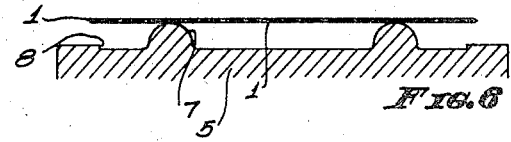
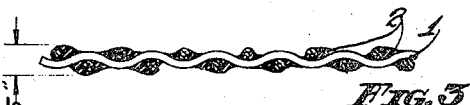
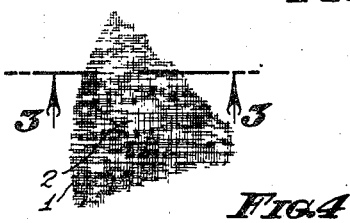
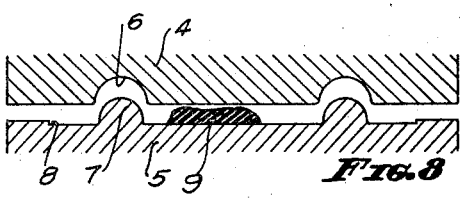
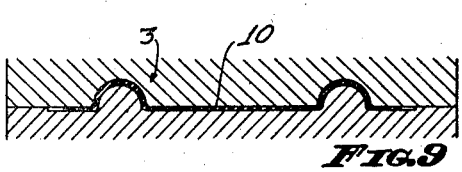
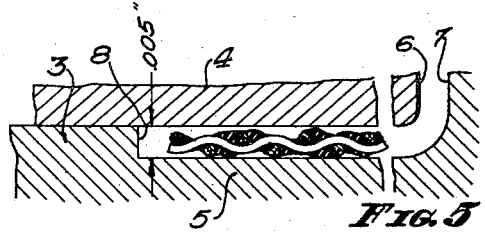
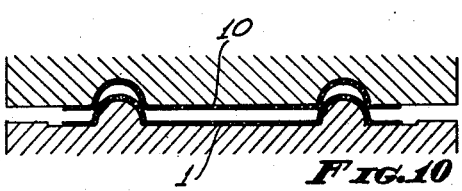
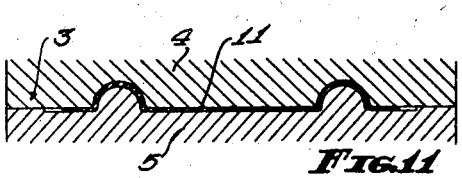
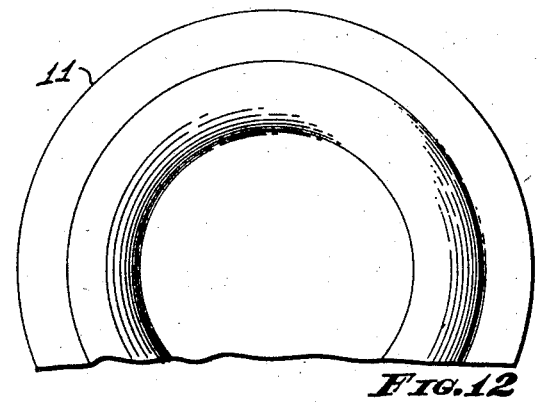
INVENTOR
JAMES C. ARNOLD
BY
ATTORNEY Patented June 29, 1948

2,444,394

UNITED STATES PATENT OFFICE 2,444,394

METHOD OF MOLDING DIAPHRAGMS

James C. Arnold, Los Angeles, Calif., assignor to Lane-Wells Company, Los Angeles, Calif., a corporation of Delaware Application March 11, 1943, Serial No. 478,819

2 Claims. (Cl. 154—110)

My invention relates to methods of molding diaphragms and similar relatively thin walled articles, and among the objects of my invention are:

First, to provide a method of this character whereby reinforcing is molded within extremely thin, highly flexible diaphragms having little or no tendency to stretch under its intended operating conditions;

Second, to provide a method of this character which minimizes the strain placed on the reinforcing fabric during molding, so that extremely thin and therefore relatively delicate fabrics may be molded, particularly in those cases where the fabric is to occupy the major portion of the diaphragm thickness and, consequently, the mold space accommodating the fabric is limited; and Third, to provide a method of this character which produces improved diaphragms without requiring change in the molding equipment.

With the above and other objects in view, as may appear hereinafter, reference is directed to the accompanying drawing, in which:

Figure 1 is an exaggerated fragmentary sectional view of the fabric employed as reinforcing in the diaphragm made by my process or method, taken through I—I of Figure 2;

Figure 2 is a fragmentary elevational view of the reinforcing fabric;

Figure 3 is an exaggerated fragmentary sectional view taken through 3—3 of Figure 4, showing the fabric coated with a cement;

Figure 4 is a fragmentary elevational view of the coated reinforcing fabric;

Figure 5 is a fragmentary sectional view of a mold substantially at the same exaggerated scale as Figures 1 and 3;

Figures 6, 7, 8, 9, 10 and 11 are transverse sectional views of a mold at reduced scale, showing the several steps of my process or method; and Figure 12 is a top or plan view of the finished diaphragm made by my method.

My method is designed particularly for the manufacture of relatively thin and highly flexible diaphragms or similar relatively thin walled articles which, however, contain reinforcing. One of the difficulties encountered in making reinforced thin section diaphragms is that the conventional molding process places undue strain upon the fabric used to reinforce the diaphragm, destroying or at least distorting the fabric so that it interferes with the proper functioning of the diaphragm. With my process such diaphragms may be constructed even though the thickness may be on the order of five thousandths (.005) of an inch. The fabric I employed is preferably a high grade silk such as "6 Momme Habuti," although other fabrics may be used, depending upon the nature of use of the diaphragm. The fabric I is coated with cement 2 on one or both sides, such as rubber cement, or in case the diaphragm is going to be exposed to liquids which are injurious to rubber, any one of the various "synthetic" rubber, or rubberlike cements, may be used. The coating is not complete, that is, the interstices of the fabric are not entirely closed, so that the fabric remains porous. The cement is preferably fluid enough that the strands of the fabric are thoroughly wetted.

In order to illustrate the process, it is necessary to show the diaphragm thickness at a greatly exaggerated scale; and, to indicate the relatively thin nature of the diaphragm which I desire to make by my method, I have indicated some typical dimensions which, however, are given for the purpose of illustration only and are not intended as a limitation. In this respect, the fabric is shown as .003" thick. Upon being coated with cement and the cement allowed to dry, the thickness of fabric and cement is approximately .0045". The cemented fabric thus prepared is placed in a mold 3 comprising upper and lower sections 4 and 5. The mold may take any form in which it is desired to shape a diaphragm. For convenience, the mold is shown as comprising an upper section 4 having an annular groove of semi-circular cross section 6 and the bottom mold section as having a complementary annular rib 7. Clearance is provided between the two parts of the molds by a clearance shoulder 8. This shoulder, as indicated in Figure 5, is approximately .005" deep if the coated fabric has substantially the thickness shown in Figure 3. This clearance may be, and is preferably, uniform throughout the die.

The coated fabric is placed in the die, as shown in Figure 6, and the cement is partially cured, as shown in Figure 7, that is, it remains in there for a period shorter than that required to completely cure the cement which has been applied to the fabric. After the fabric and cement have been partially cured within the mold it is removed. The curing period is long enough to cause the cement to retain the fabric in the shape defined by the mold.

After the fabric is removed a small quantity of molding material 9, which may be substantially the same as the cement except that it may be a paste, powder or plastic rather than in liquid form, is placed in the mold as shown in Figure 8. The mold is closed, causing the material to fill the mold. The material is then partially cured to form a sealing sheet or membrane 10, as indicated in Figure 9. The mold is separated, as shown in Figure 10, and the sealing sheet adheres to one side of the mold. This is accomplished by dusting talc or other suitable material, or by otherwise preparing the surface of one side of the mold, so that the sealing sheet has less tendency to adhere thereto than to the other section of the mold.

When the mold is separated, as shown in Figure 10, the previously formed cemented fabric is reinserted and the mold is again closed, as shown in Figure 11, and remains closed until the curing time has been completed. The finished product 11 appears as shown in Figure 12.

The clearance provided by the mold is slightly greater than the nominal thickness of the cemented fabric shown in Figure 2. Consequently, in the initial molding operation on the cemented fabric alone, the fabric and cement are not under great pressure, and the fabric is free to slide relative to the surfaces of the mold in order to accommodate itself to the shape defined by the channel 6 and rib 7. Thus, the fabric is bent to substantially its final shape without the threads being placed under any tensional stress. This is evidenced by the fact that the threads of this fabric appear to run straight, both crosswise and lengthwise, throughout the surface of the completed diaphragm. After the cover sheet is molded and the fabric reinserted, the combined initial thickness of the cover sheet and fabric is greater than the clearance of the mold, so that the entire molding pressure is applied. However, no appreciable lateral flow of material occurs and the threads of the fabric are therefore not disturbed due, apparently, to the fact that the sealing sheet flows perpendicularly to the fabric, that is, transversely through the interstices of the fabric rather than laterally. An intimate bond is accomplished between the cement and sealing sheet, which being initially thoroughly bonded to the fabric insures a permanent bond between the fabric and sealing sheet.

The resulting product is a reinforced diaphragm which can be made thinner than has been heretofore possible. The presence of the reinforcing is of utmost importance in such thin diaphragms and it is, furthermore, important that the threads be as straight as possible, for the diaphragm should flex in response to pressure differentials without changing its dimensions, that is, it should not stretch appreciably when subjected to pressures within its operating range. The presence of the fabric insures against such stretching.

While the article used as an illustration is in the form of a flat disc with a ridge of semi-circular cross section, it should be noted that the article may take many forms. My process in any case has particular application whenever the walls of the article must be extremely thin and the reinforcing has convolutions involving curvature in two directions.

Where the terms "bend," "bending," or "bent" are employed in the specification and the claims they are not intended to be limited to pure bending, but are intended to include such distortion or displacement of the fibers of the sheet material as may be necessary to impart to it a double curvature such as that illustrated in the drawing.

Various changes and alternate arrangements may be made within the scope of the appended claims, in which it is my intention to claim all novelty inherent in the invention.

I claim:

1. A method of making a reinforced thin article which comprises coating a previously woven thin porous fabric reinforcing sheet with a heat curable plastic material in an amount sufficient to only partially fill the pores of the sheet, bending said sheet in a mold into a shape approximating the desired final shape of the finished article while permitting free sliding movement of said sheet relative to the mold surfaces, applying heat to the thus bent and coated sheet to cure the plastic material coating sufficiently to cause the sheet to retain said shape, molding additional plastic material without reinforcement into a shape approximating the desired final shape of the finished article, superposing and molding said bent sheet and said molded additional plastic material into the desired final shape at a molding pressure sufficient to cause said additional plastic material to flow into and complete the filling of the pores of said sheet.

2. A method of making a reinforced thin article having double curvature which method comprises coating a previously woven thin porous fabric reinforcing sheet with a heat curable plastic material in an amount sufficient to only partially fill the pores of said sheet, bending said sheet in a mold into a double curved shape approximating the desired final shape of the finished article while permitting free sliding movement of said sheet relative to the mold surfaces, applying heat to the thus bent and coated sheet to cure the plastic material coating sufficiently to cause the sheet to retain said shape, molding additional plastic material without reinforcement into a double curved shape approximating the desired final shape of the finished article, superposing and molding said bent sheet and said molded additional plastic material into the desired final shape at a molding pressure sufficient to cause said additional plastic material to flow into and complete the filling of the pores of said sheet.

JAMES C. ARNOLD.

REFERENCES CITED

The following references are of record in the file of this patent:

UNITED STATES PATENTS

| Number | Name | Date |
|---|---|---|
| 343,439 | Crane | June 8, 1886 |
| 375,073 | Kayser | Dec. 20, 1887 |
| 665,989 | Bechtold | Jan. 15, 1901 |
| 1,209,644 | Price | Dec. 19, 1916 |
| 1,322,631 | Segall | Nov. 25, 1919 |
| 1,430,677 | Ose | Oct. 3, 1922 |
| 1,559,702 | Hopkinson | Nov. 3, 1925 |
| 1,575,388 | Roberts | Mar. 12, 1926 |
| 1,821,487 | Thompson | Sept. 1, 1931 |
| 1,989,702 | Leguillon | Feb. 5, 1935 |
| 1,998,988 | Greenbaum et al. | Apr. 23, 1935 |
| 2,202,013 | Lougheed | May 28, 1940 |
| 2,208,583 | Hoof | July 23, 1940 |
| 2,254,926 | Zimmerman | Sept. 2, 1941 |
| 2,270,185 | Dulmage | Jan. 13, 1942 |
| 2,274,095 | Sawyer | Feb. 24, 1942 |
| 2,312,227 | Yant | Feb. 23, 1943 |
| 2,378,642 | Kopplin | June 19, 1945 |

FOREIGN PATENTS

| Number | Country | Date |
|---|---|---|
| 3,014 | Great Britain | Nov. 24, 1865 |